US012591137B2

(12) United States Patent　　　(10) Patent No.:　US 12,591,137 B2
Maric et al.　　　　　　　　　　　(45) **Date of Patent:　*Mar. 31, 2026**

(54) ELECTRONIC DEVICES WITH BIASED GUIDE RAILS

(71) Applicant: Apple Inc., Cupertino, CA (US)

(72) Inventors: Ivan S. Maric, Campbell, CA (US); Aidan N. Zimmerman, Poway, CA (US); Jason C. Sauers, Sunnyvale, CA (US); Jia Tao, San Jose, CA (US); John S. Camp, Los Gatos, CA (US); Phil M. Hobson, Menlo Park, CA (US); Jacob L. Smith, Austin, TX (US); Evan D. Christensen, San Jose, CA (US)

( * ) Notice: Subject to any disclaimer, the term of this patent is extended or adjusted under 35 U.S.C. 154(b) by 488 days.

This patent is subject to a terminal disclaimer.

(21) Appl. No.: 18/156,327

(22) Filed: Jan. 18, 2023

(65) Prior Publication Data

US 2023/0296893 A1　　　Sep. 21, 2023

Related U.S. Application Data

(63) Continuation of application No. PCT/US2021/042078, filed on Jul. 16, 2021.

(60) Provisional application No. 63/057,216, filed on Jul. 27, 2020.

(51) Int. Cl.
*G02B 27/01*　　　　(2006.01)

(52) U.S. Cl.
CPC ..... *G02B 27/0149* (2013.01); *G02B 27/0101* (2013.01); *G02B 2027/0132* (2013.01); *G02B 2027/0161* (2013.01); *G02B 2027/0169* (2013.01)

(58) Field of Classification Search
None
See application file for complete search history.

(56) References Cited

U.S. PATENT DOCUMENTS

| 8,020,989 B2 | 9/2011 | Jannard et al. |
| 8,040,292 B2 | 10/2011 | Ronzani et al. |
| 9,646,574 B2 | 5/2017 | Hoellwarth |
| (Continued) | | |

FOREIGN PATENT DOCUMENTS

| CN | 1702343 A | 11/2005 |
| CN | 102259576 A | 11/2011 |
| (Continued) | | |

*Primary Examiner* — Fred Tzeng
(74) *Attorney, Agent, or Firm* — Treyz Law Group, P.C.; David K. Cole

(57) ABSTRACT

A head-mounted device may be provided with displays. The displays and lenses through which images on the displays are viewed may be mounted in optical modules. Positioners may be used to move the optical modules towards and away from each other to adjust the head-mounted device to accommodate different user interpupillary distances. To support and guide the optical modules, the optical modules may be slidably mounted to guide rails. The guide rails may be biased against the optical modules using biasing systems. By using the biasing systems, misalignment between the optical modules can be reduced. If desired, guide rail sensors may be used to monitor the positions of the guide rails. In some configurations, the optical modules may be mounted to the guide rails using kinematic mounting.

25 Claims, 9 Drawing Sheets

(56) References Cited

U.S. PATENT DOCUMENTS

| | | | | |
|---|---|---|---|---|
| 9,658,460 | B2 | 5/2017 | Lee et al. | |
| 9,814,386 | B2 * | 11/2017 | Abramoff | A61B 3/152 |
| 9,958,685 | B2 * | 5/2018 | Kovaluk | G06F 1/1639 |
| 10,539,787 | B2 | 1/2020 | Haddick et al. | |
| 10,798,370 | B2 * | 10/2020 | Zhang | G02B 27/0176 |
| 11,163,160 | B2 * | 11/2021 | Poulad | G02B 27/0176 |
| 11,307,654 | B1 * | 4/2022 | Zhang | G06V 40/18 |
| 2004/0212776 | A1 * | 10/2004 | Spitzer | G02C 7/08 |
| | | | | 351/41 |
| 2008/0239523 | A1 * | 10/2008 | Beck | G02B 27/0172 |
| | | | | 359/823 |
| 2010/0067129 | A1 * | 3/2010 | Ozaki | G02B 7/102 |
| | | | | 359/823 |
| 2013/0293448 | A1 | 11/2013 | Jannard | |
| 2014/0320972 | A1 | 10/2014 | Magyari et al. | |
| 2017/0102549 | A1 * | 4/2017 | Lee | G02B 27/0176 |
| 2018/0103917 | A1 | 4/2018 | Kim et al. | |
| 2019/0033687 | A1 | 1/2019 | Katsumata | |
| 2020/0033560 | A1 | 1/2020 | Weber et al. | |
| 2020/0081253 | A1 | 3/2020 | Montevirgen et al. | |
| 2020/0341283 | A1 * | 10/2020 | McCracken | G02B 27/0172 |
| 2021/0333506 | A1 * | 10/2021 | Maric | G02B 27/0172 |
| 2023/0266597 | A1 * | 8/2023 | Greenstein | G02B 27/0179 |
| | | | | 359/630 |
| 2024/0427112 | A1 * | 12/2024 | Maric | G02B 27/0176 |
| 2025/0035933 | A1 * | 1/2025 | Meursing | G02B 27/0172 |

FOREIGN PATENT DOCUMENTS

| | | | |
|---|---|---|---|
| CN | 103133530 | A | 6/2013 |
| CN | 204903862 | U | 12/2015 |
| CN | 207731024 | U | 8/2018 |
| CN | 109505504 | A | 3/2019 |
| CN | 110228317 | A | 9/2019 |
| CN | 209690628 | U | 11/2019 |
| WO | 2011132485 | A1 | 10/2011 |

* cited by examiner

ELECTRONIC DEVICES WITH BIASED GUIDE RAILS

This application is a continuation of international patent application No. PCT/US2021/042078, filed Jul. 16, 2021, which claims the benefit of U.S. provisional patent application No. 63/057,216, filed Jul. 27, 2020, which are hereby incorporated by reference herein in their entireties.

FIELD

This relates generally to electronic devices, and, more particularly, to head-mounted electronic devices.

BACKGROUND

Electronic devices may contain components mounted in a housing. Head-mounted devices have structures that allow these devices to be worn on the heads of users.

SUMMARY

A head-mounted device may be provided with displays. Lenses may be provided to allow a user to view images on the displays. A left optical module may be provided that includes a left display and left lens and a right optical module may be provided that includes a right display and right lens.

To support and guide the optical modules, the optical modules may be slidably mounted to guide rails. Positioners may be used to move the optical modules towards and away from each other along the guide rails to adjust the head-mounted device to accommodate different user interpupillary distances.

Each optical module may have portions configured to form openings or other structures that receive the guide rails. The openings may be, for example, cylindrical openings for receiving cylindrical guide rails. The guide rails may be biased against the surfaces of the cylindrical openings and/or other portions of the optical modules using springs or other biasing systems. By using the biasing systems, misalignment between the optical modules can be maintained within desired limits, while permitting the optical modules to slide along the guide rails during interpupillary distance adjustments.

If desired, guide rail sensors may be used to monitor the positions of the guide rails. In some configurations, the optical modules may be coupled to the guide rails using kinematic mounts.

DETAILED DESCRIPTION

An electronic device may have input-output devices for gathering input and providing output. These devices may include optical components such as cameras, displays, and lenses.

Figure 1:
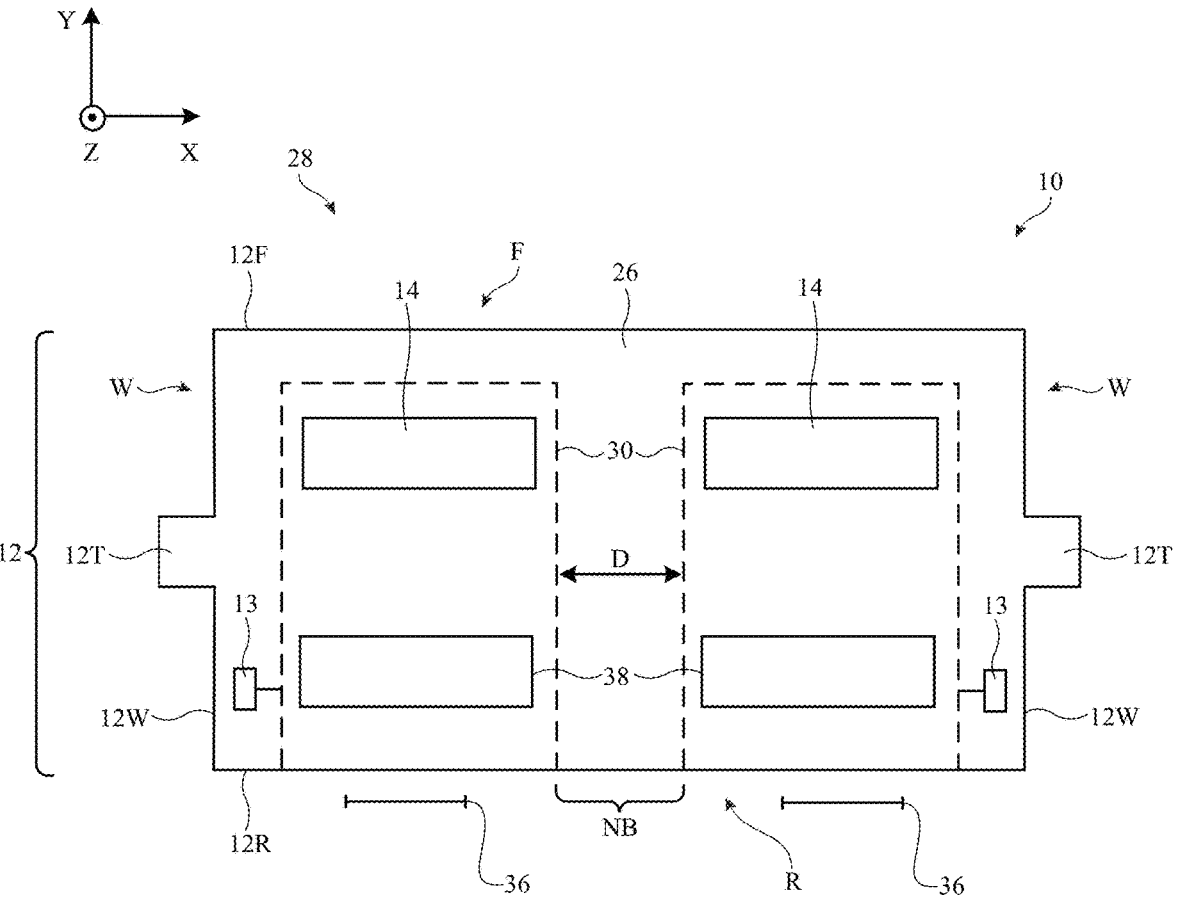
FIG. 1 is a top view of an illustrative electronic device in accordance with an embodiment.

A top view of an illustrative electronic device is shown in FIG. 1. Electronic device 10 of FIG. 1 may be a head-mounted device or other suitable device. As shown in FIG. 1, device 10 may have a housing such as housing 12. Housing 12, which may sometimes be referred to as a housing wall, external housing, housing structures, enclosure, or case, may be formed from materials such as polymer, glass, metal, crystalline materials such as sapphire, ceramic, fabric, foam, wood, other materials, and/or combinations of these materials.

Device 10 may have any suitable shape. Housing 12 may, for example, be configured to form a head-mounted housing in the shape of a pair of goggles (e.g., goggles having optional head straps such as straps 12T, a nose bridge portion in nose bridge region NB that is configured to fit over a user's nose and help support housing 12 on the user's nose, etc.) and/or other head-mounted structures. Housing 12 may separate interior region 26 from exterior region 28. Housing 12 may include portions such as front portion (front wall) 12F on front face F of device 10, rear portion (rear wall) 12R on opposing rear face R of device 10, and sidewall portions such as sidewall portions 12W on sides W that extend between front portion 12F and rear portion 12R, so that housing 12 encloses interior region 26.

Electrical and optical components may be mounted within housing 12 (e.g., in interior region 26). As an example, housing 12 may have optical components in interior region 26 such as displays 14 and lenses 38. Displays 14 and lenses 38 may be mounted in optical modules 30 (sometimes referred to as lens barrels, display and lens support structures, etc.). Images from displays 14 may be viewable from eye boxes 36 through lenses 38. A left display and left lens in a left optical module 30 may be used to present a left-eye image to a user's left eye in a left eye box 36 and a right display and right lens in a right optical module 30 may be used to present a right-eye image to a user's right eye in right eye box 36. Manual adjustment mechanisms and/or electrically adjustable actuators 13 (e.g., motors or other electrically adjustable positioners) may be used to move optical modules 30 horizontally across the front of the user's face (e.g., to adjust distance D between modules 30 along a direction parallel to the X-axis or nearly parallel to the X-axis of FIG. 1). Optical modules 30 may, for example, be moved closer to each other or farther apart from each other as needed to accommodate different user interpupillary distances.

Figure 2:
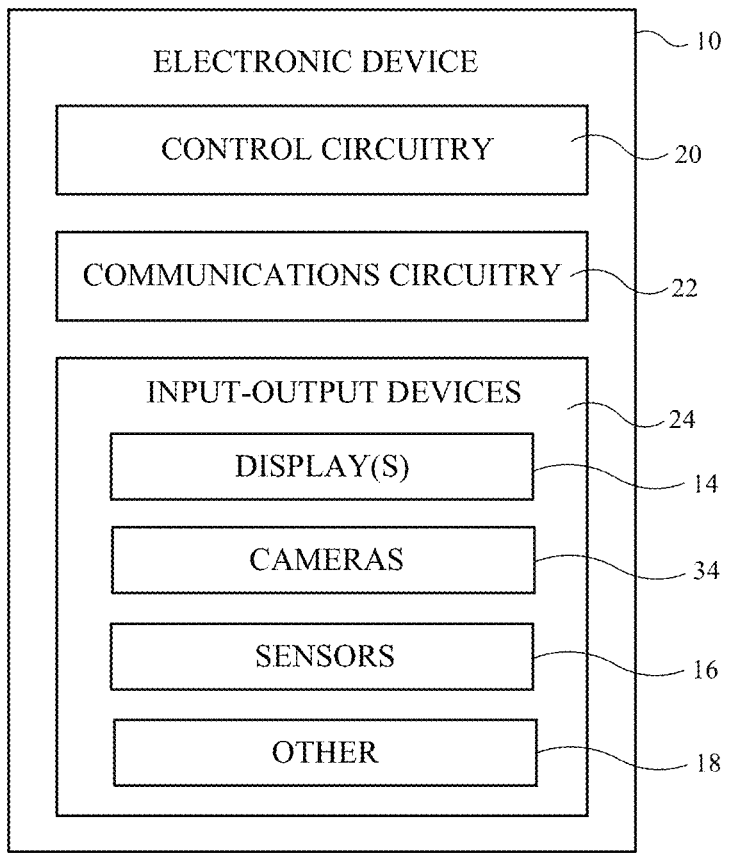
FIG. 2 is a schematic diagram of an illustrative electronic device in accordance with an embodiment.

A schematic diagram of an illustrative electronic device is shown in FIG. 2. Device 10 of FIG. 2 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections) and/or may be used to receive such information from external electronic devices. Each of these external devices may include components of the type shown by device 10 of FIG. 2.

As shown in FIG. 2, electronic device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid-state drive), volatile memory (e.g., static or dynamic random-access-memory), etc. Processing circuitry in control circuitry 20 may be used to gather input from sensors (e.g., cameras) and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Electronic components such as input-output devices 24 may be used in gathering user input, in gathering information on the environment surrounding the user, and/or in providing a user with output.

Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Devices 24 may also include cameras 34. Cameras 34 may include visible light cameras, infrared cameras, and/or cameras that are sensitive at multiple wavelengths, may include three-dimensional camera systems such as depth sensors (e.g., structured light sensors and/or depth sensors based on stereo imaging devices that capture three-dimensional images), may include time-of-flight cameras, and/or may include other cameras. Cameras 34 may face toward the user of device 10 and/or away from the user of device 10.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, optical sensors such as self-mixing sensors and light detection and ranging (lidar) sensors, humidity sensors, moisture sensors, gaze tracking sensors, electromyography sensors to sense muscle activation, facial sensors, interferometric sensors, time-of-flight sensors, magnetic sensors, resistive sensors, distance sensors, angle sensors, and/or other sensors. In some arrangements, device 10 may use sensors 16 and/or other input-output devices 24 to gather user input. For example, input-output devices 24 such as buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

Input-output devices 24 may include optical components such as depth sensors (e.g., structured light sensors or other sensors that gather three-dimensional image data), optical proximity sensors, ambient light sensors (e.g., color ambient light sensors), optical time-of-flight sensors and other sensors 16 that are sensitive to visible and/or infrared light and that may emit visible and/or infrared light (e.g., devices 24 may contain optical sensors that emit and/or detect light). For example, a visible-light image sensor in a camera may have a visible light flash or an associated infrared flood illuminator to provide illumination while the image sensor captures a two-dimensional and/or three-dimensional image. An infrared camera such as an infrared structured light camera that captures three-dimensional infrared images may have an infrared flood illuminator that emits infrared flood illumination and/or may have a dot projector the emits an array of infrared light beams. Infrared proximity sensors may emit infrared light and detect the infrared light after the infrared light has reflected from a target object.

If desired, electronic device 10 may include additional components (see, e.g., other devices 18 in input-output devices 24). The additional components may include haptic output devices, actuators for moving movable structures in device 10, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 3:
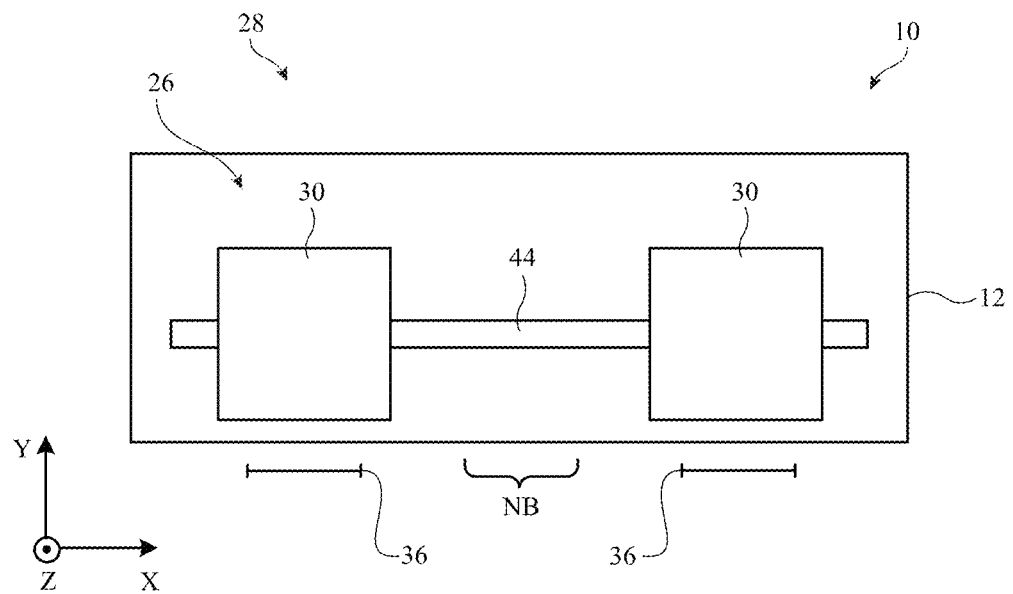
FIG. 3 is top view of an illustrative electronic device with optical module guide rails in accordance with an embodiment.

To help maintain desired alignment between optical mod-ules 30 as optical modules 30 are moved by actuators 13 (FIG. 1), optical modules 30 may be mounted on optical module guiding structures such as guide rails or other elongated support members. This type of arrangement is shown in the top view of device 10 of FIG. 3. As shown in FIG. 3, optical modules 30 may be slidably coupled to guide rails 44 to allow modules 30 to move horizontally (e.g., laterally along the X-axis to accommodate different user interpupillary distances).

Guide rails 44 may have circular cross-sectional shapes (e.g., guide rails 44 may be cylindrical rods) or may have other cross-sectional shapes. Guide rods 44 may be formed from metal, polymer, and/or other materials. Hollow and/or solid members may be used in forming guide rods 44. To help reduce friction between guide rods 44 and optical modules 30, guide rods 44 and/or mating portions of mod-ules 30 may, if desired, be provided with a low-friction coating (e.g., nickel, etc.).

Figure 4:
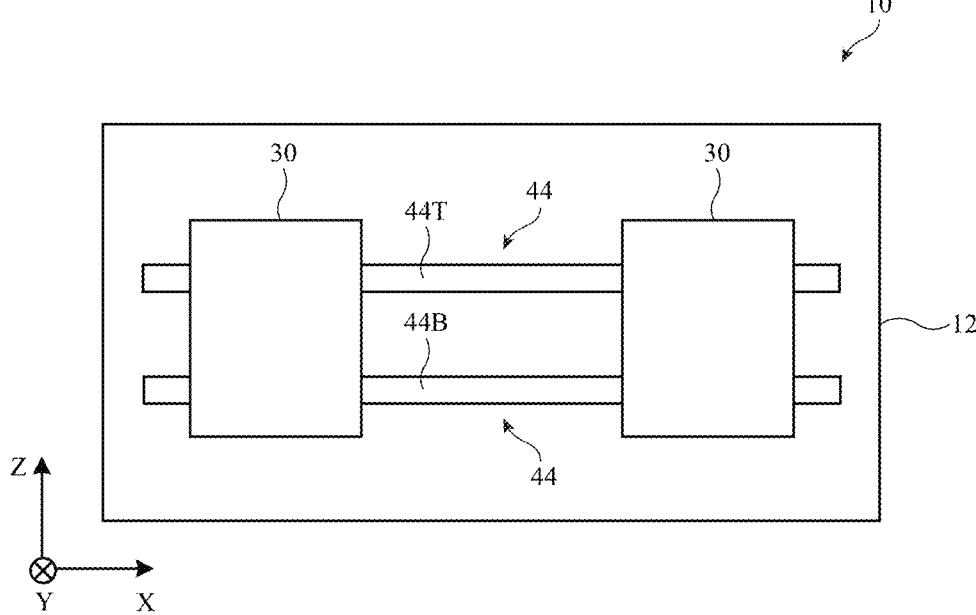
FIG. 4 is a rear view of illustrative electronic device with optical module guide rails in accordance with an embodiment.

Guide rails 44 may span the width of housing 12. There may be left and right guide rails 44 in device 10 that are joined at a housing support structure aligned with nose bridge portion NB or left and right guide rails 44 may be formed as integral portions of a single guide rail member that extends across housing 12. Rails 44 may be straight or may, if desired, have a slight bend at nose bridge portion NB (e.g., to rake the left and right sides of the guide rails backwards slightly to conform to the shape of a user's face). As shown in the rear view of device 10 of FIG. 4, there may be upper and lower guide rails 44 on the left and right of device 10 such as upper guide rail 44T and lower guide rail 44. Arrangements with fewer guide rails or more guide rails may be used, if desired.

Figure 5:
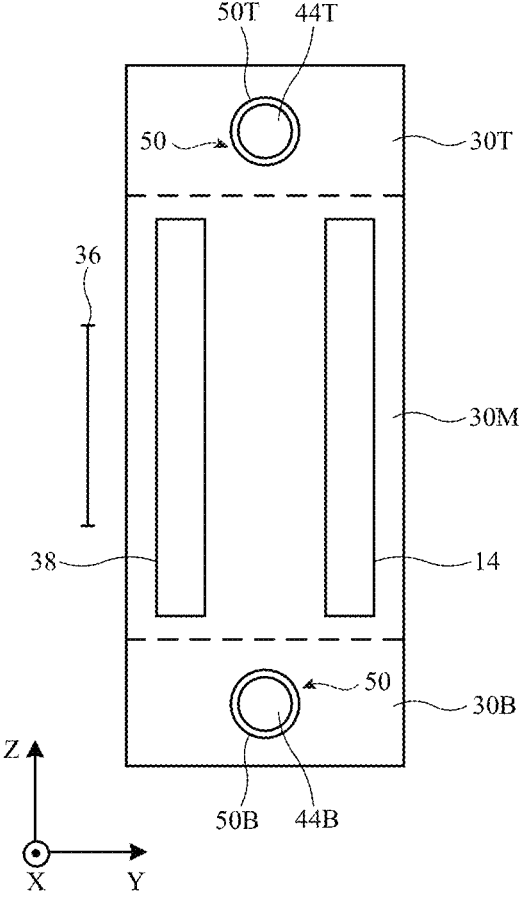
FIG. 5 is a side view of an illustrative optical module with guide rails in accordance with an embodiment.

FIG. 5 is a side view of an illustrative optical module 30 mounted on guide rails 44. In the example of FIG. 5, optical module 30 has an upper portion such as portion 30T and a lower portion such as portion 30B. Portions 30T and/or 30B may be integrally formed with main supporting structure 30M of the lens barrel structures and/or other support structures of optical module 30 and/or may be separate members that are coupled (e.g., using welds, fasteners, adhesive, etc.) to main supporting structure 30M. Lens 38 may be aligned with display 14 so that an image on display 14 may be viewed through lens 38 from eye box 36.

As shown in FIG. 5, optical module 30 may have portions that receive and couple to guide rails 44 while allowing optical module 30 to slide along guide rails 44. For example, upper portion 30T may have a guide rail opening (optical module opening) 50 such as opening 50T that receives upper guide rail 44T and lower portion 30B may have a guide rail opening such as opening 50B that receives lower guide rail 44B. Openings 50T and 50B may be by cylindrical openings with circular cross-sectional shapes that receive the cylin-drical members forming rails 44T and 44B and/or may have other shapes that partly or fully surround rails 44T and 44B.

To prevent rails 44 from becoming stuck in guide rail openings 50 of optical module 30, the inner diameter of optical module openings may be slightly larger (e.g., by 2-50 microns, at least 5 microns, less than 100 microns, or other suitable amount) than the outer diameter of rails 44. To prevent excess motion, which could lead to misalignment of optical modules, device 10 may be provided with guide rail biasing systems. The guide rail biasing systems may have movable biasing members (e.g., pins, plates, spherical mem-bers, hemispherical members, etc.) and biasing elements that apply force to the biasing members. The biasing elements may be, for example, springs such as coil springs, leaf springs, and/or other spring members, may be compressed polymer (e.g., elastomeric material, foam, etc.), may be magnets, and/or may be other biasing components that can be used to bias the biasing members in a desired direction.

Using the guide rail biasing systems, guide rails 44 may be pushed towards desired positions within openings 50 to help remove undesired play between guide rails 44 and openings 50. As an example, guide rails 44 may be pressed against the inner surfaces of openings 50 (e.g., at a location on the side of openings 50 that faces eye boxes 36 rather than the opposing side of openings 50 that faces outwardly away from the user) and/or may be pressed against a structure mounted within openings 50 such as a pin or other support member.

Figure 6A:
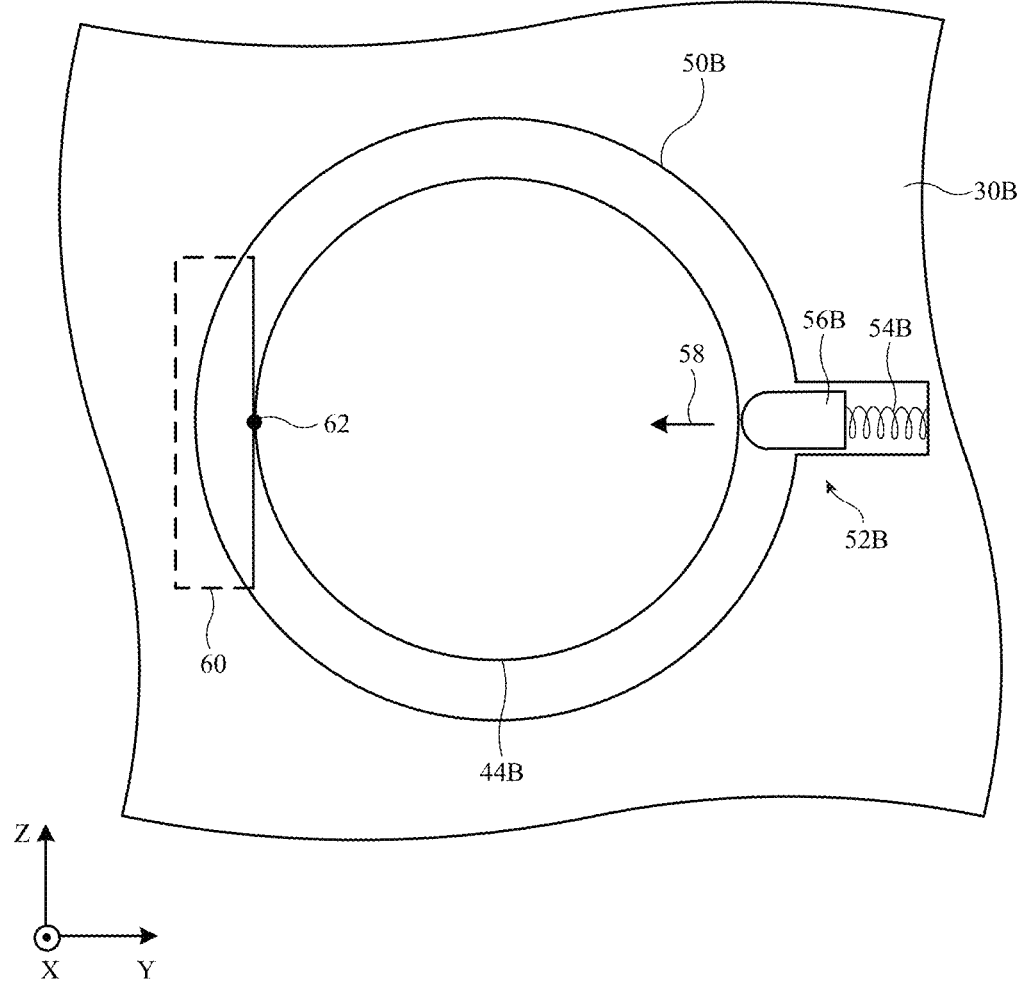
FIGS. 6A, 6B, and 7 are cross-sectional side views of illustrative guide rail biasing mechanisms in accordance with embodiments.

Consider, as an example, the cross-sectional side view of optical module portion 30B of FIG. 6A. As shown in FIG. 6A, portion 30B may have an opening such as opening 50B that receives lower guide rail 44B. Lower guide rail biasing system 52B may have a lower guide rail biasing element such as lower guide rail biasing element 54B (e.g., a spring) and a corresponding movable biasing system member such as biasing member 56B (e.g., a pin with a hemispherical head) and/or system 52B may be formed from other biasing structures (e.g., a leaf spring, compressed foam, etc.). Under pressure from biasing element 54B, member 56B may press in direction 58 against an adjacent surface of guide rail 44B (e.g., the side of rail 44B facing biasing system 52B and facing away from the user). Pin 60 may be mounted on an opposing side of opening 50B. As a result of the force imposed on guide rail 44B in direction 58, guide rail 44B may bear against member 56 (or, if desired, the inner surface of opening 50B) at contact location 62 (e.g., a location on the surface of opening 50B facing the user and eye boxes). This creates a well-defined location for guide rail 44B relative to the structures of optical module 30 and helps prevent rail 44B from moving excessively in the Y and/or Z dimensions within opening 50B, thereby helping to ensure that optical module 30 is aligned satisfactorily with respect to eye box 30. Additional friction and resistance to sliding of optical module 30 along the X axis is created by the use of biasing systems such as biasing system 52B of FIG. 6A, but when it is desired to move optical modules 30 with respect to each other to adjust their spacing to accommodate a user inter-pupillary distance, sufficient force along the X dimension can be applied to overcome this friction.

Figure 6B:
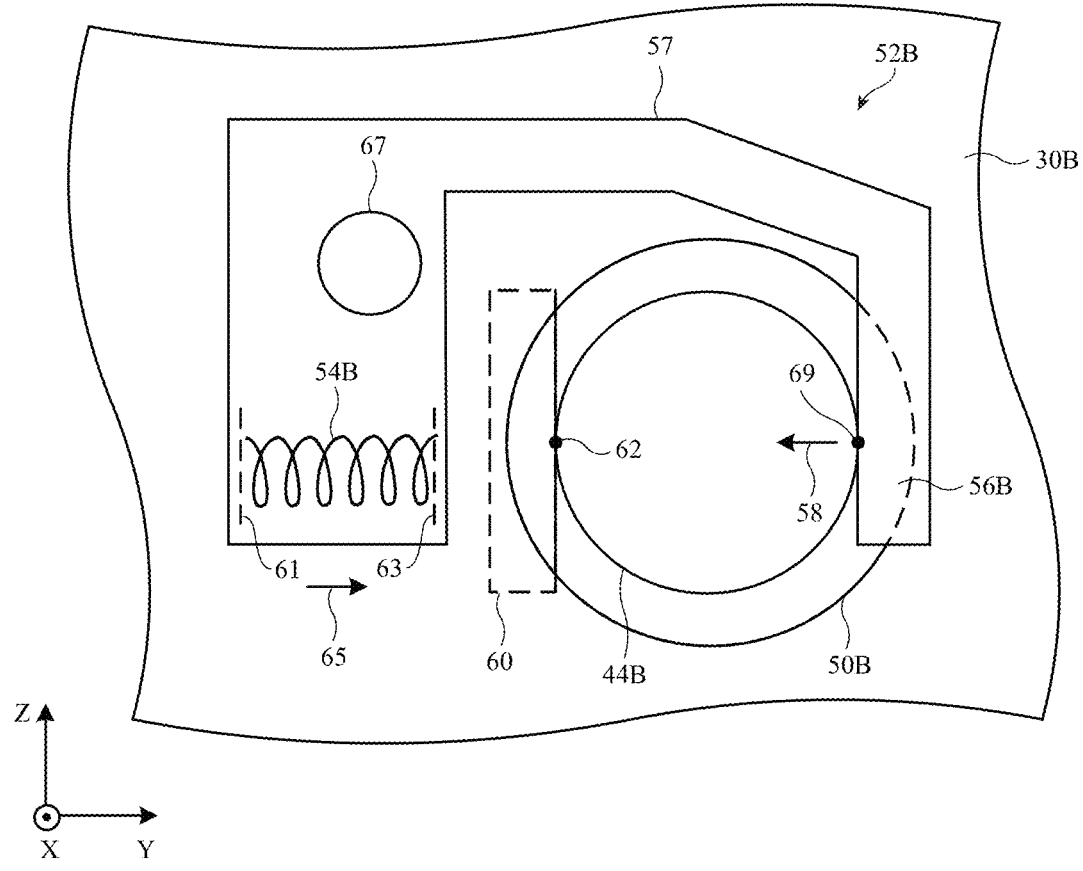

If desired, spring 54B and biasing element 56B may be located on opposite sides of guide rail 44B. Consider, as an example, the illustrative configuration of biasing system 52B that is shown in FIG. 6B. In this configuration, biasing system 52B has a biasing member 57 with a portion that forms biasing element 56B. Biasing member 57 may be attached to portion 30B of optical module 30 using an attachment mechanism such as screw 67 or other fastener. Screw 67 may have a threaded shaft or other structure that is fixedly attached to portion 30B. The shaft of screw 67 may be received within a slot in member 57. The slot may extend parallel to the Y axis of FIG. 6B to allow biasing member 57 to slide back and forth parallel to the Y axis.

A biasing element such as spring 54B (e.g., a compression spring or other biasing spring) may be used to bias member 57 in the −Y direction. Spring 54B may have a first end that presses against a surface of member 57 such as surface 61 and an opposing second end that presses against a surface of portion 30B such as surface 63. When member 57 is moved in direction 65, spring 59 is compressed. Spring 59 thereafter presses against surface 61 and biases the portion of member 57 that forms element 54B in direction 58 relative to portion 30B. This causes member 57 to contact rail 44B at contact location 69 and to thereby bias the opposing side of rail 44B against pin 60 at contact location 62.

Member 57 may be formed from one or more materials. For example, member 57 may be formed from a metal (e.g., aluminum, stainless steel, etc.). The metal may be covered with a hard low-friction coating such as an electroless nickel coating to enhance wear resistance. As another example, member 57 may be formed from a polymer (e.g., a low-friction composite polymer filled with carbon fibers, fiberglass fibers, or other fibers). The low-friction composite polymer may be formed from a polymer such as PEEK (polyether ether ketone) or other polymer (e.g., a polymer that may be shaped by a molding process such as injection molding).

Figure 7:
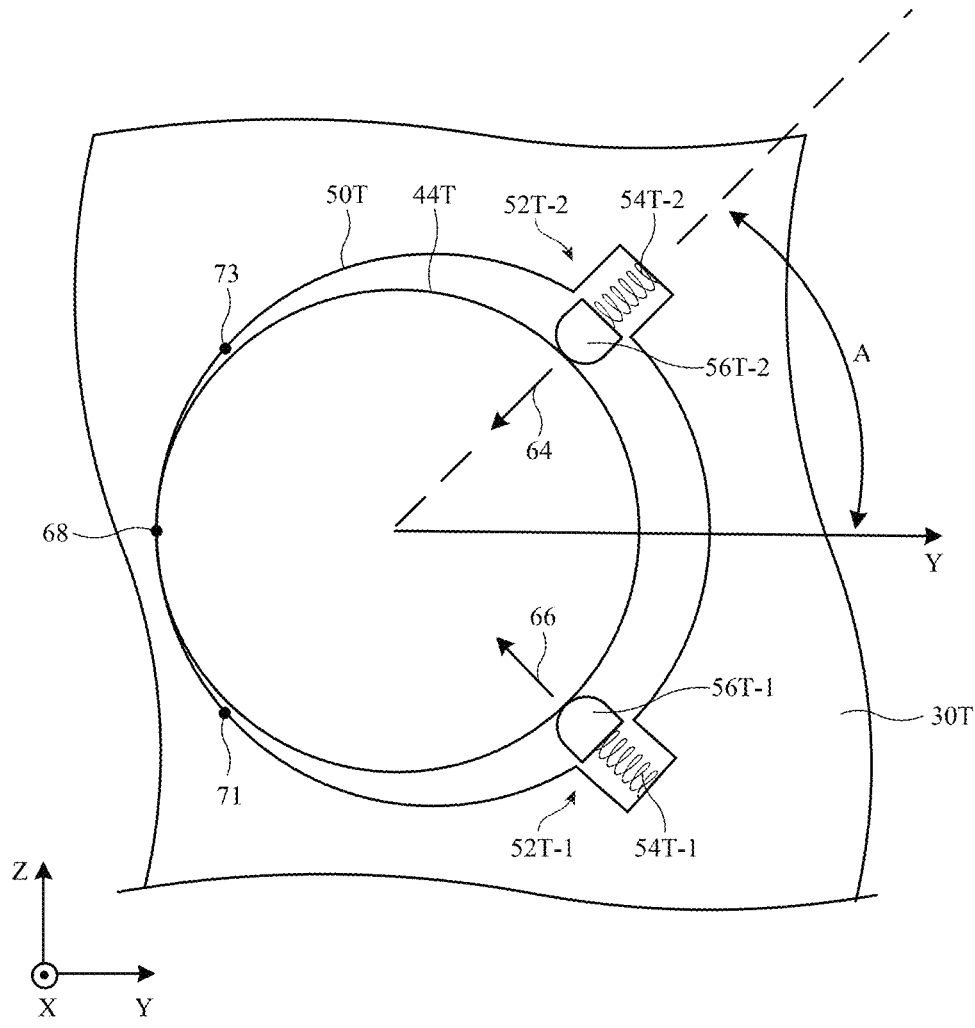

The examples of FIGS. 6A and 6B demonstrate how lower guide rail 44B may be provided with an associated guide rail biasing system (illustrative system 52B). If desired, upper guide rails 44T may also be provided with guide rail biasing systems. As shown in the cross-sectional side view of upper portion 30T of optical module 30, optical module 30 may have biasing systems 52T-1 and 52T-2. System 52T-1 may have biasing element 54T-1 for forcing movable biasing member 56T-1 against an adjacent surface of guide rail 44T in direction 66 (or may have other biasing structures such as a leaf spring, compressed foam, etc.). System 52T-2 may have biasing element 54T-2 for forcing movable biasing member 56T-2 against an adjacent surface of guide rail 44 (or may have other biasing structures sch as a leaf spring, compressed foam, etc.). Using systems 52T-1 and 52T-2, guide rail 44T may be biased leftward so that the surface of guide rail 44T contacts the inner surface of opening 50T at nominal biasing location 68 (e.g., a location on the surface of opening 50T that faces the user and the eye boxes associated with device 10). The force of gravity tends to pull downwardly (in the −Z direction of FIG. 7) on guide rail 44T. To compensate for the force of gravity and thereby ensure that location 68 is located on the left side of guide rail 44T (facing the user and eye box 36) as shown in FIG. 7, biasing element 54T-1 may be stronger than biasing element 54T-2.

During operation of device 10, a user's face and/or other external objects may impose forces on optical modules 30. This gives rise to a potential for three different types of misalignment between the left and right optical modules in device 10.

Rotation of optical modules 30 about the X axis, which may sometimes be referred to as splay, may cause a first type of misalignment in which one image appears at a different height than the other image. For example, splay may rotate the left eye image from the left optical module up relative to the left eye box while rotating the right eye image from the right optical module down relative to the right eye box.

Rotation of optical modules 30 about the Y axis, which may sometimes be referred to as image rotation, may produce a second type of misalignment in which the left and/or right images from modules 30 to appear tilted relative to the horizon. For example, the left eye image may be rotated counterclockwise and the right eye image may be rotated clockwise.

Another type of misalignment that may arise between optical modules 30 relates to rotation of one or both of optical modules 30 about the Z axis. This type of misalignment, which may sometimes be referred to as vergence, may be characterized by situations in which the left and/or right optical module points too far to the left or right in the X-Y plane.

All of these types of misalignment are preferably maintained at low levels (e.g., below +/−0.5°, below +/−0.4°, below +/−0.3°, or below +/−0.2°, as examples). In some situations, splay is the most undesired type of misalignment for users, so minimization of splay may be particular helpful in enhancing user comfort.

The use of guide rail biasing systems such as the illustrative biasing systems of FIGS. 6A, 6B, and 7 may help minimize optical module misalignment. When biasing systems 52T-1 and 52T-2 perform satisfactorily, the left optical module will be biased against upper rail 44T at a location such as location 68 of FIG. 7 and will be biased against lower rail 44B at a location such as location 62 of FIG. 6A or FIG. 6B, whereas the right optical module will likewise be biased against upper rail 44T at a location such as location 68 of FIG. 7 and will be biased against lower rail 44B at a location such as location 62 of FIG. 6A or FIG. 6B. In this case, both the left and right optical modules will have the same position relative to guide rails 44T and 44B and there will be no splay. A potential for splay may arise when stress from a drop event or other unexpected excessive force causes a biasing system to fail.

Consider, as an example, a worse case splay scenario in which biasing system 52T-2 in the left optical module fails due to excessive force and in which biasing system 52T-1 in the right optical module fails due to excessive force. Although this type of asymmetric failure changes the biasing locations of the left and right optical modules, the biasing arrangement of FIG. 7 helps prevent undesired splay from arising. Failure of biasing system 52T-2 in the left optical module will cause guide rail 44T in the left optical module to be positioned against the inner surface of opening 50T at location 73, whereas failure of biasing system 52T-1 in the right optical module will cause guide rail 44T in the right optical module to be positioned against the inner surface of opening 50T at a different location such as location 71.

In the example of FIG. 7, system 52T-2 is located at an angle A=+45° relative to the Y axis and system 52T-1 is located at an angle A=−45° relative to the Y axis. When systems 52T-2 and 52T-1 are operating satisfactorily, guide rail 44T will therefore press against the inner side wall of opening 50T at location 68. When opening 50T in the left optical module contacts rail 44T at location 73 while opening 50T in the right optical module contacts rail 44T at location 71, both the left and right optical modules will be positioned more to the right (in the orientation of FIG. 7) than when in their desired nominal biased position. Lower guide rod 44B is biased satisfactorily at location 62 with respect to lower optical module portion 30B for both the left and right optical modules (in this example). As a result, both the left and right optical modules will tip forward slightly (rotating a small amount about the X axis), under outward pressure from the user's face. Although both the left and right optical modules tilt forward in this way, the amount of tilt of the left optical module, which is dictated by the lateral displacement of rail 44T experienced when rail 44T contacts opening 50T at position 73, is equal to the amount of tilt of the right optical module, which is dictated by the lateral displacement of rail 44T experienced when rail 44T contacts opening 50T at position 71. No splay will therefore result. Because the configuration of the biasing systems of FIG. 7 tends to prevent splay from arising, this configuration may sometimes be referred to as a splay-optimized or splay-immune biasing scheme. Other biasing schemes may be used, if desired (e.g., schemes for the upper guide rail that have more biasing systems per optical module, schemes with fewer biasing systems per optical module, schemes in which the biasing systems press in different directions such as the +Z direction, –Y direction, etc.). The configuration of FIG. 7 is illustrative.

Figure 8:
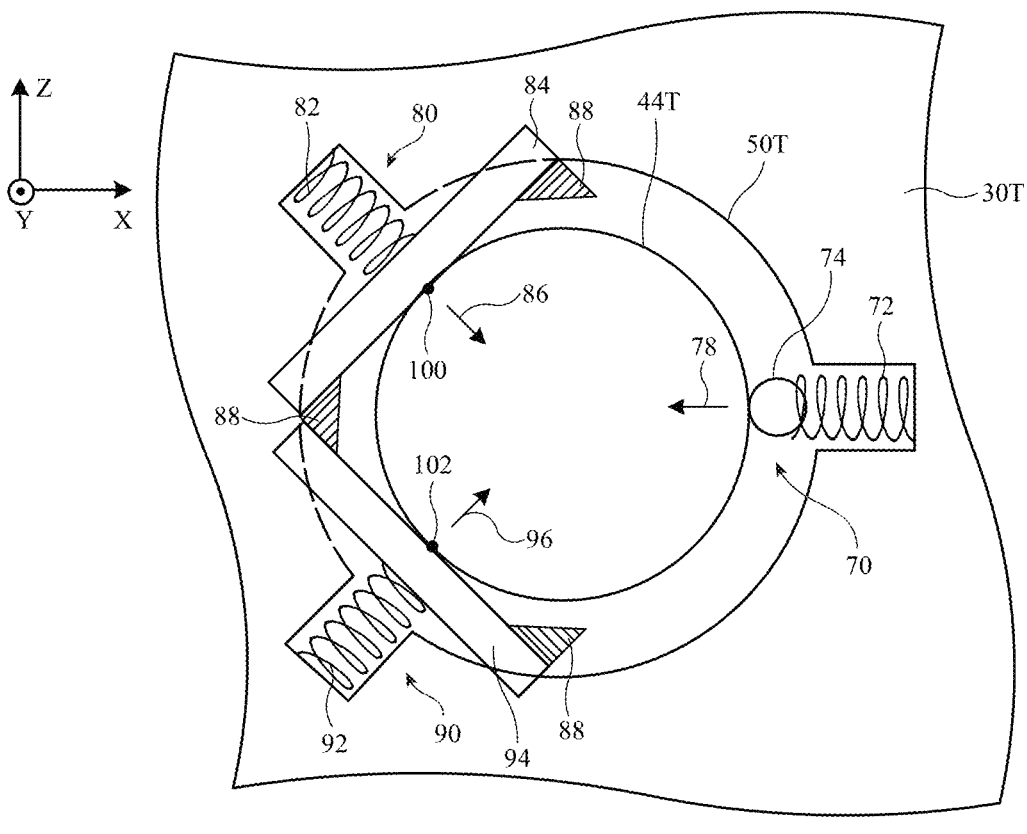
FIG. 8 is a cross-sectional side view of a portion of a kinematic guide rail mounting system in accordance with an embodiment.
Figure 9:
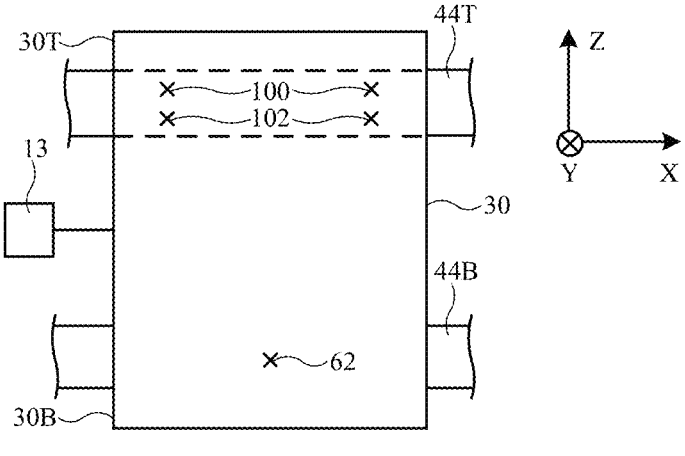
FIG. 9 is a side view of a kinematic optical module guide rail mounting system in accordance with an embodiment.

FIGS. 8 and 9 show how a kinematic mounting scheme may be used to couple guide rails 44 and optical modules 30. As shown in FIG. 8, upper guide rails 44T may be biased in the –Y direction by biasing system 70. Biasing system 70 may include biasing element 72 and movable biasing member 74 that contacts an adjacent portion of guide rail 44T and pushes guide rail 44T in direction 78 or may include other biasing structures (e.g., a leaf spring, compressed foam, etc.). Biasing system 80 may have a biasing element such as biasing element 82 that pushes biasing member 84 (e.g., a cylindrical pin) in direction 86 until motion of member 84 is stopped by stop structures 88. Biasing system 90 may have a biasing element such as biasing element 92 that pushes biasing member 94 in direction 96 until motion of member 94 is stopped by stop structures 88. In this configuration, guide rail 44T is biased into contact with member 84 at known location 100 and into contact with member 94 at known location 102. Lower guide rail 44B may be biased to known location 62 using a biasing system such as system 52B of FIG. 6A or FIG. 6B.

FIG. 9 is a rear view of optical module 30 with this type of kinematic rail mounting arrangement. As shown in FIG. 9, there may be two of biasing systems 80 in portion 30T of module 30 and two of biasing systems 90 in portion 30T of module 30 in addition to two of biasing systems 70. This establishes a first pair of known contact locations towards the right end of rail 44T (e.g., a first location 100 and a first location 102) and, establishes a second pair of known contact locations at a different location along the length of rail 44T such as towards the left end of rail 44T (e.g., a second location 100 and a second location 102). In lower portion 30B, the location of optical module relative to guide rail 44B is established at known location 62. Determining these five known locations on optical module 30 where rails 44 contact module 30 (e.g., two locations 100 in upper portion 30T, two locations 102 in upper portion 30T, and one location 62 in lower portion 30B), helps constrain five of the six degrees of freedom for motion of module 30 relative to rails 44 and the other support structures of device 10. The sixth degree of freedom (motion along the X axis) is not constrained except by operation of actuator 13, so that actuator 13 may be used to adjust the X-axis location of module 30 to accommodate different user interpupillary distances.

If desired, control circuitry 20 may use one or more sensors 16 to monitor the location of optical modules 30. If misalignment is detected, corresponding action can be taken. For example, positioners may be adjusted to correct for the misalignment, image data for a display and/or camera may be warped to compensate for misalignment, alerts may be provided to the user and/or others, etc.

Figure 10:
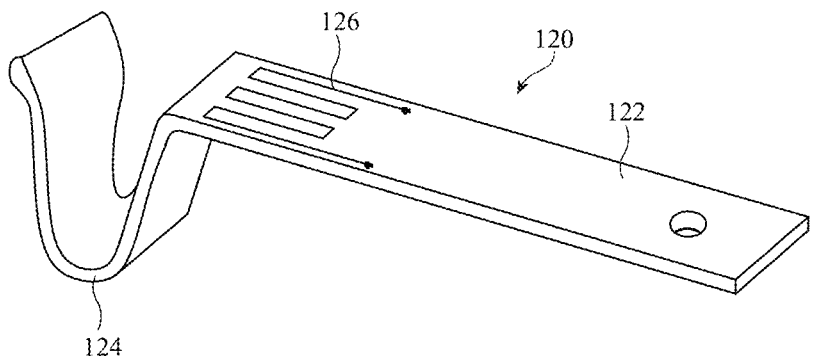
FIG. 10 is a perspective view of an illustrative guide rail sensor based on a strain gauge in accordance with an embodiment.
Figure 11:
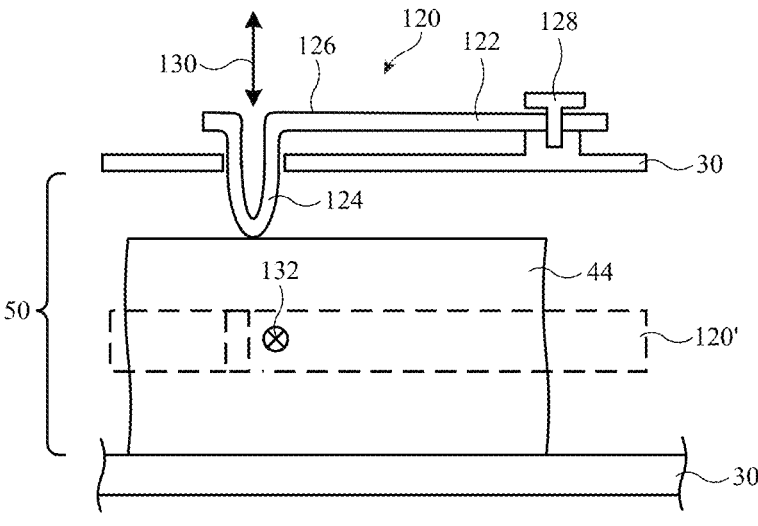
FIG. 11 is a cross-sectional side view of an illustrative optical module with a guide rail sensor in accordance with an embodiment.

An illustrative optical module sensor system is shown in FIGS. 10 and 11. FIG. 10 is a perspective view of an illustrative guide rail position sensor. Sensor 120 of FIG. 10 has a biasing member such as leaf spring member 122 with a protruding portion such as portion 124. Strain gauge 126 may be coupled to member 122 and may be monitored by control circuitry 20 to detect bending in member 122. As shown in FIG. 11, sensor 120 of FIG. 10 may be attached to optical module 30 with a fastener such as screw 128 or other attachment mechanism so that protruding portion 124 protrudes into opening 50 and into contact an adjacent surface of guide rail 44. Changes in the position of guide rail 44 will result in changes in the detected strain by sensor 120, so sensor 120 can monitor the position of guide rail 44 relative to optical module 30 along axis 130. If desired, additional sensors such as sensor 120 may be located at additional positions about rail 44 (see, e.g., illustrative orthogonal position 120' of FIG. 11, which allows position measurements along axis 132).

As described above, one aspect of the present technology is the gathering and use of information such as information from input-output devices. Such information may include personal data. The present disclosure contemplates that the entities responsible for the collection, analysis, disclosure, transfer, storage, or other use of such personal data will comply with well-established privacy policies and/or privacy practices. In particular, such entities should implement and consistently use privacy policies and practices that are generally recognized as meeting or exceeding industry or governmental requirements for maintaining personal data private and secure.

In accordance with an embodiment, a head-mounted device is provided that includes a head-mounted support structure having left and right guide rails, and left and right optical modules mounted for sliding motion on the left and right guide rails, respectively, the right optical module has a first biasing system that presses against the right guide rail in a first direction and has a second biasing system that presses against the right guide rail in a second direction, and the left optical module has a third biasing system that presses against the left guide rail in a third direction and has a fourth biasing system that presses against the left guide rail in a fourth direction.

In accordance with another embodiment, the left optical module includes a left lens and a left display that provides a left eye image viewable through the left lens from a left eye box, and a right lens and a right display that provides a right eye image viewable through the right lens from a right eye box.

In accordance with another embodiment, the left and right optical modules are separated by a distance and the left and right optical modules are configured to slide along the left and right guide rails to adjust the distance.

In accordance with another embodiment, the head-mounted device includes an additional left guide rail and an additional right guide rail, the left optical module is mounted to the additional left guide rail for sliding motion and the right optical module is mounted to the right guide rail for sliding motion.

In accordance with another embodiment, the left optical module includes a fifth biasing system configured to press against the additional left guide rail and the right optical module includes a sixth biasing system configured to press against the additional right guide rail.

In accordance with another embodiment, the left and right guide rails include cylindrical rods, the left optical module has a left opening with a circular cross-sectional shape configured to receive the left guide rail and the right optical module has a right opening with a circular cross-sectional shape configured to receive the right guide rail.

In accordance with another embodiment, the first and second biasing systems are configured to press the left guide rail against a location on an inner surface of the left opening facing the left eye box and the third and fourth biasing systems are configured to press the right guide rail against a location on an inner surface of the right opening facing the right eye box.

In accordance with another embodiment, the first and second biasing systems are configured to form part of a kinematic mounting system for the left optical module and the third and fourth biasing systems are configured to form part of a kinematic mounting system for the right optical module.

In accordance with an embodiment, a head-mounted device is provided that includes a head-mounted support structure having an upper left elongated support member, a lower left elongated support member, an upper right elongated support member, and a lower right elongated support member, a left optical component slidably coupled to the upper left elongated support member and the lower left elongated support member, the left optical component includes a biasing system configured to press against the upper left elongated support member, and a right optical component slidably coupled to the upper right elongated support member and the lower right elongated support member, the right optical component includes a biasing system configured to press against the upper right elongated support member.

In accordance with another embodiment, the left optical component includes a left optical module having a left lens and a left display configured to display a left eye image to a left eye box through the left lens and includes a right optical module having a right lens and a right display configured to display a right eye image to a right eye box through the right lens.

In accordance with another embodiment, the upper left elongated support member includes an upper left cylindrical guide rail, the lower left elongated support member includes a lower left cylindrical guide rail, the upper right elongated support member includes an upper right cylindrical guide rail, and the lower right elongated support member includes a lower right cylindrical guide rail.

In accordance with another embodiment, the left optical module has an upper opening with a circular cross-sectional shape configured to receive the upper left cylindrical guide rail and has a lower opening with a circular cross-sectional shape configured to receive the lower left cylindrical guide rail and the right optical module has an upper opening with a circular cross-sectional shape configured to receive the upper right cylindrical guide rail and has a lower opening with a circular cross-sectional shape configured to receive the lower right cylindrical guide rail.

In accordance with another embodiment, the left optical module has an additional biasing system, the biasing system and the additional biasing system of the left optical module are configured to press against the upper left cylindrical guide rail in first and second different respective directions, the right optical module has an additional biasing system, and the biasing system and the additional biasing system of the right optical module are configured to press against the upper right cylindrical guide rail in third and fourth different respective directions.

In accordance with another embodiment, the first and second directions are orthogonal and the third and fourth directions are orthogonal.

In accordance with another embodiment, the first and second directions are oriented to press the upper left cylindrical guide rail against a surface of the upper opening in the left optical module that faces the left eye box and the third and fourth directions are oriented to press the upper right cylindrical guide rail against a surface of the upper opening in the right optical module that faces the right eye box.

In accordance with another embodiment, the left optical module includes a lower left biasing system configured to press against the lower left cylindrical guide rail and the right optical module includes a lower right biasing system configured to press against the lower right cylindrical guide rail.

In accordance with an embodiment, a head-mounted device is provided that includes a head-mounted support structure having a guide rail, an optical module having a portion configured to receive the guide rail, and a biasing system coupled to the optical module that is configured to press against the guide rail and force the guide rail against the portion of the optical module.

In accordance with another embodiment, the biasing system includes a biasing element and a biasing member that is pressed against an adjacent surface of the guide rail by the biasing element, the portion is configured to form an opening with a cylindrical inner surface that receives the guide rail, and the biasing member forces the guide rail against the cylindrical inner surface.

In accordance with another embodiment, the optical module includes a lens and a display configured to provide an image that is viewable through the lens.

In accordance with another embodiment, the head-mounted device includes an electrically adjustable positioner configured to slide the optical module along the guide rail.

In accordance with another embodiment, the head-mounted device includes a guide rail position sensor configured to measure a position of the guide rail relative to the optical module.

In accordance with another embodiment, the portion is configured to form an opening with a cylindrical inner surface that receives the guide rail and the biasing system includes a biasing member, and a biasing spring compressed between the biasing member and the optical module that is configured to press the biasing member against the guide rail.

In accordance with another embodiment, the biasing spring is located on a first side of the guide rail and is configured to press the biasing member against an opposing second side of the guide rail.

In accordance with another embodiment, the head-mounted device includes a pin that protrudes into the opening.

In accordance with another embodiment, the biasing member is configured to bias the first side of the guide rail against the pin.

The foregoing is illustrative and various modifications can be made to the described embodiments. The foregoing embodiments may be implemented individually or in any combination.

What is claimed is:

1. A head-mounted device, comprising:

a head-mounted support structure having left and right guide rails; and left and right optical modules mounted for sliding motion on the left and right guide rails, respectively, wherein:

the right optical module has a first biasing system that presses against the right guide rail in a first direction and has a second biasing system that presses against the right guide rail in a second direction; and the left optical module has a third biasing system that presses against the left guide rail in a third direction and has a fourth biasing system that presses against the left guide rail in a fourth direction.

2. The head-mounted device defined in claim 1 wherein the left optical module comprises:

a left lens and a left display that provides a left eye image viewable through the left lens from a left eye box; and a right lens and a right display that provides a right eye image viewable through the right lens from a right eye box.

3. The head-mounted device defined in claim 2 wherein the left and right optical modules are separated by a distance and wherein the left and right optical modules are configured to slide along the left and right guide rails to adjust the distance.

4. The head-mounted device defined in claim 3 further comprising an additional left guide rail and an additional right guide rail, wherein the left optical module is mounted to the additional left guide rail for sliding motion and wherein the right optical module is mounted to the additional right guide rail for sliding motion.

5. The head-mounted device defined in claim 4 wherein the left optical module comprise a fifth biasing system configured to press against the additional left guide rail and wherein the right optical module comprises a sixth biasing system configured to press against the additional right guide rail.

6. The head-mounted device defined in claim 1 wherein the left and right guide rails comprise cylindrical rods, wherein the left optical module has a left opening with a circular cross-sectional shape configured to receive the left guide rail and wherein the right optical module has a right opening with a circular cross-sectional shape configured to receive the right guide rail.

7. The head-mounted device defined in claim 6 wherein the third and fourth biasing systems are configured to press the left guide rail against a location on an inner surface of the left opening facing a left eye box and wherein the first and second biasing systems are configured to press the right guide rail against a location on an inner surface of the right opening facing a right eye box.

8. The head-mounted device defined in claim 1 wherein the first and second biasing systems are configured to form part of a kinematic mounting system for the right optical module and wherein the third and fourth biasing systems are configured to form part of a kinematic mounting system for the left optical module.

9. A head-mounted device, comprising:

a head-mounted support structure having an upper left elongated support member, a lower left elongated support member, an upper right elongated support member, and a lower right elongated support member;

a left optical component slidably coupled to the upper left elongated support member and the lower left elongated support member, wherein the left optical component comprises a biasing system configured to press against the upper left elongated support member; and a right optical component slidably coupled to the upper right elongated support member and the lower right elongated support member, wherein the right optical component comprises a biasing system configured to press against the upper right elongated support member.

10. The head-mounted device defined in claim 9 wherein the left optical component comprises a left optical module having a left lens and a left display configured to display a left eye image to a left eye box through the left lens and the right optical component comprises a right optical module having a right lens and a right display configured to display a right eye image to a right eye box through the right lens.

11. The head-mounted device defined in claim 10 wherein the upper left elongated support member comprises an upper left cylindrical guide rail, wherein the lower left elongated support member comprises a lower left cylindrical guide rail, wherein the upper right elongated support member comprises an upper right cylindrical guide rail, and wherein the lower right elongated support member comprises a lower right cylindrical guide rail.

12. The head-mounted device defined in claim 11 wherein the left optical module has an upper opening with a circular cross-sectional shape configured to receive the upper left cylindrical guide rail and has a lower opening with a circular cross-sectional shape configured to receive the lower left cylindrical guide rail and wherein the right optical module has an upper opening with a circular cross-sectional shape configured to receive the upper right cylindrical guide rail and has a lower opening with a circular cross-sectional shape configured to receive the lower right cylindrical guide rail.

13. The head-mounted device defined in claim 12 wherein the left optical module has an additional biasing system, wherein the biasing system and the additional biasing system of the left optical module are configured to press against the upper left cylindrical guide rail in first and second different respective directions, wherein the right optical module has an additional biasing system, and wherein the biasing system and the additional biasing system of the right optical module are configured to press against the upper right cylindrical guide rail in third and fourth different respective directions.

14. The head-mounted device defined in claim 13 wherein the first and second directions are orthogonal and wherein the third and fourth directions are orthogonal.

15. The head-mounted device defined in claim 14 wherein the first and second directions are oriented to press the upper left cylindrical guide rail against a surface of the upper opening in the left optical module that faces the left eye box and wherein the third and fourth directions are oriented to press the upper right cylindrical guide rail against a surface of the upper opening in the right optical module that faces the right eye box.

16. The head-mounted device defined in claim 15 wherein the left optical module further comprises a lower left biasing system configured to press against the lower left cylindrical guide rail and wherein the right optical module further comprises a lower right biasing system configured to press against the lower right cylindrical guide rail.

17. A head-mounted device, comprising:

a head-mounted support structure having a guide rail;

an optical module having a portion configured to receive the guide rail; and a biasing system coupled to the optical module that is configured to press against the guide rail and force the guide rail against the portion of the optical module.

18. The head-mounted device defined in claim 17 wherein the biasing system comprises a biasing element and a biasing member that is pressed against an adjacent surface of the guide rail by the biasing element, wherein the portion is configured to form an opening with a cylindrical inner surface that receives the guide rail, and wherein the biasing member forces the guide rail against the cylindrical inner surface.

19. The head-mounted device defined in claim 18 wherein the optical module comprises a lens and a display configured to provide an image that is viewable through the lens.

20. The head-mounted device defined in claim 19 further comprising an electrically adjustable positioner configured to slide the optical module along the guide rail.

21. The head-mounted device defined in claim 17 further comprising a guide rail position sensor configured to measure a position of the guide rail relative to the optical module.

22. The head-mounted device defined in claim 17 wherein the portion is configured to form an opening with a cylindrical inner surface that receives the guide rail and wherein the biasing system comprises:

a biasing member; and a biasing spring compressed between the biasing member and the optical module that is configured to press the biasing member against the guide rail.

23. The head-mounted device defined in claim 22 wherein the biasing spring is located on a first side of the guide rail and is configured to press the biasing member against an opposing second side of the guide rail.

24. The head-mounted device defined in claim 23 further comprising a pin that protrudes into the opening.

25. The head-mounted device defined in claim 24 wherein the biasing member is configured to bias the first side of the guide rail against the pin.

* * * * *